US 10,735,514 B2

(12) United States Patent
Todwal et al.

(10) Patent No.: US 10,735,514 B2
(45) Date of Patent: Aug. 4, 2020

(54) REMOTE APPLICATION CONFIGURATION ON NETWORK-ATTACHED STORAGE

(71) Applicant: Western Digital Technologies, Inc., San Jose, CA (US)

(72) Inventors: Sapna Murari Todwal, San Jose, CA (US); Sailesh Rachabathuni, Santa Clara, CA (US); Cipson Jose Chiriyankandath, Santa Clara, CA (US); Ruslan Azibovich Sharifullin, Mountain View, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 340 days.

(21) Appl. No.: 15/689,924

(22) Filed: Aug. 29, 2017

(65) Prior Publication Data

US 2019/0068707 A1 Feb. 28, 2019

(51) Int. Cl.
*H04L 29/08* (2006.01)
*H04L 12/24* (2006.01)
(Continued)

(52) U.S. Cl.
CPC ........ *H04L 67/1097* (2013.01); *G06F 3/0604* (2013.01); *G06F 3/067* (2013.01);
(Continued)

(58) Field of Classification Search
CPC . H04L 67/1097; H04L 67/28; H04L 41/0806; H04L 67/32; H04L 67/34;
(Continued)

(56) References Cited

U.S. PATENT DOCUMENTS

| 6,356,863 | B1 * | 3/2002 | Sayle | G06F 16/192 |
| | | | | 703/27 |
| 6,622,220 | B2 * | 9/2003 | Yoshida | H04L 12/467 |
| | | | | 370/392 |

(Continued)

FOREIGN PATENT DOCUMENTS

WO WO-2004085622 A2 * 10/2004 ............. G10L 15/26

OTHER PUBLICATIONS

Brown. "Create an embedded Web server to administer your application". https://www.techrepublic.com/article/create-an-embedded-web-server-to-administer-your-application/, Nov. 25, 2002, 12:00 AM PST (Year: 2002).*

(Continued)

*Primary Examiner* — Umar Cheema
*Assistant Examiner* — James Ross Hollister
(74) *Attorney, Agent, or Firm* — Chang & Hale LLP

(57) ABSTRACT

Systems and methods are disclosed for remote configuration of applications on a network-attached storage device (NAS). In certain embodiments, a NAS includes a non-volatile memory module, a network interface, and control circuitry configured to store a mapping of an application identifier and a port for each of the plurality of applications stored in the non-volatile memory. The control circuitry receives, from a client over the network interface, a request to configure a first application of the plurality of applications, the request comprising a first port corresponding to the first application. The control circuitry determines a first embedded web server of the first application based on the mapping and the first port received in the request and transmits the request to the first embedded web server on the first application. The control circuitry receives, from the first application, data for providing a user interface for configuring the (Continued)

first application and transmits the user interface data to the client.

20 Claims, 4 Drawing Sheets

(51) Int. Cl.
  *G06F 3/06* (2006.01)
  *H04L 29/06* (2006.01)
(52) U.S. Cl.
  CPC ........ *G06F 3/0629* (2013.01); *H04L 41/0806* (2013.01); *H04L 67/28* (2013.01); *H04L 67/32* (2013.01); *H04L 67/34* (2013.01); *H04L 63/083* (2013.01); *H04L 67/42* (2013.01)
(58) Field of Classification Search
  CPC ..... H04L 63/083; H04L 67/42; G06F 3/0604; G06F 3/067; G06F 3/0629
  See application file for complete search history.

(56) References Cited

U.S. PATENT DOCUMENTS

| | | | |
|---|---|---|---|
| 8,561,087 B2 | 10/2013 | Bryant-Rich et al. | |
| 8,812,769 B2 | 8/2014 | Bryant-Rich et al. | |
| 2004/0051731 A1 | 3/2004 | Chang et al. | |
| 2004/0148375 A1 | 7/2004 | Levett et al. | |
| 2009/0119395 A1* | 5/2009 | Kodama | H04L 67/10 709/223 |
| 2010/0161712 A1* | 6/2010 | Mehta | G06Q 10/06 709/203 |
| 2013/0041931 A1* | 2/2013 | Brand | H04L 67/10 709/203 |
| 2013/0170738 A1 | 7/2013 | Capuozzo et al. | |
| 2013/0262615 A1* | 10/2013 | Ankireddypalle | G06F 3/067 709/213 |
| 2014/0237137 A1* | 8/2014 | Ervin | H04L 45/38 709/238 |
| 2017/0093827 A1* | 3/2017 | Pandian | H04L 63/08 |
| 2017/0099280 A1* | 4/2017 | Goel | H04L 63/083 |
| 2017/0264666 A1* | 9/2017 | Lee | H04L 67/16 |
| 2018/0302443 A1* | 10/2018 | Weiss | G06F 21/74 |
| 2019/0199795 A1* | 6/2019 | He | H04L 67/1095 |

OTHER PUBLICATIONS

International Search Report and Written Opinion dated Sep. 27, 2018 for PCT/US2018/038631.

* cited by examiner

CLOUD MANAGEMENT PROCESS

REMOTE APPLICATION CONFIGURATION ON NETWORK-ATTACHED STORAGE

BACKGROUND

Field

This disclosure relates to data storage systems. More particularly, the disclosure relates to systems and methods for managing shared data storage.

Description of Related Art

Network-attached storage devices provide access to data over computer networks. Some network-attached storage devices enable expanded capabilities through downloadable applications ("apps") that can be installed on the devices.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
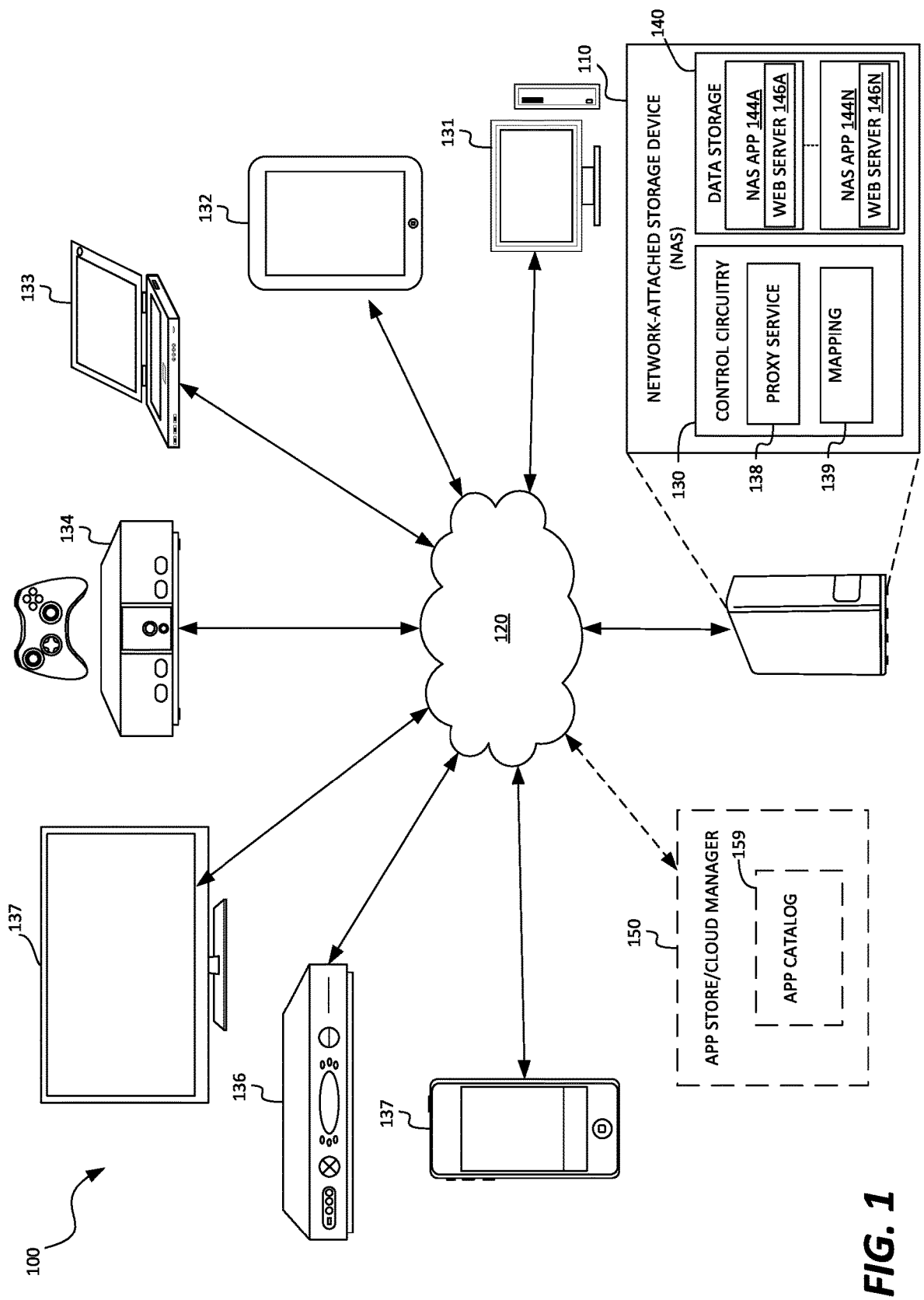
FIG. 1 is a diagram of a network-attached storage (NAS) system in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Disclosed herein are systems, devices, and methods for allowing remote configuration of applications ("apps") stored on a NAS devices. Apps are software applications. In some embodiments, apps are software designed for a single or limited purpose/function. Unlike traditional mobile apps (e.g., iOS or Android) which run on mobile devices that have screens capable of displaying the app's user interface (UI), apps running on a NAS device ("NAS apps") are running on a device that typically lacks a screen. One solution is adding an embedded web server into each NAS app. Using the embedded web server can allow mobile apps to more easily be converted to a NAS app. For example, the business logic and UI of a mobile app can remain the same or largely the same, but the UI can be provided to client devices remotely, over a network, through the embedded web server without needing to be displayed on a (non-existent) NAS display.

A proxy service operating on the NAS can register NAS apps to TCP ports. Client requests that are received by the NAS can be forwarded to the corresponding app. For example, a client device (e.g., laptop, mobile phone, desktop, tablet, etc.) attempting to configure a NAS app may be provided a Uniform Resource Locator (URL) containing the NAS address and the corresponding port of the NAS app. The client device can then use the URL to send a request to the NAS device. The NAS device receives the request and forwards the request to the appropriate app. Typically, a NAS device will have several, tens, or even more apps installed. The proxy service can maintain a mapping of NAS apps to corresponding ports in order to direct requests to the appropriate app.

Utilizing a configuration with a proxy service connecting to individual embedded web servers in each app has some advantages relative to other configurations. In comparison to a central http server serving all apps, allowing each NAS app to have its own embedded web server enables greater security as there are no shared resources at a central http server. For example, with shared resources, one app may be able to affect the operation of another app by altering a shared resource at the central http server.

In comparison to a virtual machine implementation, the embedded web servers allow a less complex design and can allow multiple apps to share access to the same file system. Unlike with virtual machines, the NAS apps on the NAS can operate on non-virtualized hardware and/or have access to shared data. In a home environment, a NAS will generally have only a single or a few users and those users may desire to easily share data with each other. For example, a home NAS may store family pictures and allowing several NAS apps to access the family pictures or other shared data can provide added convenience.

Although the principles disclosed herein may be applicable to any suitable or practical data storage system or environment, for convenience, certain embodiments are disclosed herein in the context of network-attached storage systems.

Network-Attached Storage

Network-attached storage (NAS) drives/systems can provide file-level, or object-level, data storage over a computer network, wherein access to the stored data is accessible to one or more clients. Although certain embodiments are disclosed herein in the context of files, file servers, file systems, and other file-level references, it should be understood that such references, as used herein, may refer to object-level data, or any other type of data structure, depending on the implementation.

A NAS may include hardware, software, or a combination of such elements, configured such that the NAS operates as a file server. FIG. 1 is a diagram illustrating an embodiment of a NAS system 100, in which a network-attached storage device 110 is communicatively coupled to one or more client devices over a network 120. The NAS 110 may provide file-based, or object-based, data storage services to devices coupled to the network 120. Types of client devices that may have access to the NAS 110 can include phones 137, such as smartphones, cable set-top boxes 136, smart TV's 135, video game consoles 134, laptop computers 133, tablet computers 132, desktop computers 131, wearable computers (not shown) and/or other network-connected computing devices. The network 120 may be a local area network (LAN), a wide area network (WAN) (e.g., the Internet), or other type of computer network, and the connections between the various client components of the system 100 and the network 120 may be either wired or wireless.

While certain embodiments are described herein in the context of NAS devices/systems, it should be understood that references herein to NAS's may refer to other types of data storage devices/systems, such as any type of computer device implementing software allowing for data storage access over a network. Furthermore, some embodiments disclosed here may be implemented using data storage device connections that are not over a network, but rather direct client/server connection(s). In some embodiments, the NAS devices are home NAS devices that operate on small home networks that typically have asymmetrical upload and download speeds, with download speeds multiple times faster than upload speeds.

In certain embodiments, the NAS 110 may be configurable over the network 120 by a client device interface, such as a web browser of a mobile device or desktop computing device. An operating system (e.g., a relatively low-level operating system, such as FreeNAS) may be implemented in the NAS 110 by a control circuitry 130 thereof. The NAS 110 may provide access to files using one or more network file-sharing protocols, such as NFS, SMB/CIFS, AFP, or the like.

The NAS 110 may comprise a data storage 140 for storing a plurality of NAS apps 144A-144N (collectively "NAS apps 144"), user data (e.g., files), metadata, such as system tables or the like, and/or other types of data. The data storage may comprise one or more non-volatile memory devices or modules, and may include any type of data storage media (e.g., solid-state, magnetic, hybrid) for storing the data storage 140.

In some embodiments, each NAS app 144 includes an embedded web server 146A-146N (collectively "web servers 146"), such as nanohttpd or similar HTTP servers. Preferably, the embedded web servers 146 are light-weight and have a small storage footprint to limit the memory and processing requirements of the NAS apps. When accessing NAS apps from external networks, the bottleneck created by the NAS upload speed may lead to undesirable delays. For home-based network-attached storage devices/systems, bandwidth concerns may be particularly prominent, thus a light-weight web server can be beneficial in this situation. However, other embodiments can use other types of web servers.

The NAS 110 can provide shared access to files/data stored on the NAS, such as NAS apps 144. For example, any of a plurality of clients may request, over the network 120, access to a NAS app. Such clients may make modifications to the NAS apps 144, such as configuring newly installed NAS apps.

In some embodiments, the NAS 110 is in communication, over the network 120, with an app store 150. For example, the app store 150 may be an external server or cloud service operating on a different network than the NAS 110, and accessible to the NAS via the Internet. The app store 150 can include an app catalog 159 of NAS apps that are available to be downloaded and installed by the NAS 110.

In certain embodiments, the app store 150 includes cloud manager functionalities for managing operations on the NAS 110. For example, the app store/cloud manager 150 may allow accessing the NAS 110 from external networks or perform registration functions for NAS devices. In other embodiments, the cloud manager is a separate service or server from the app store 150.

The NAS 110 may be configured to implement encryption for user data/files. For example, the NAS 110 may implement Transport Layer Security (TLS), Secure Sockets Layer (SSL), and/or Advanced Encryption Standard (AES) keys (e.g., 256-bit, 128-bit, etc.) to protect files in rest and/or in motion. The NAS 110 may further be configured to implement one or more additional security features, such as user verification, forward secrecy, and/or the like.

The control circuitry 130 may be configured, through hardware and/or software, to provide a proxy service 138 for the NAS 110. The proxy service 138 can direct communications received over the network 120 to the appropriate NAS app 144. When NAS apps are downloaded onto the NAS, the proxy server can register the NAS apps. Registration can include assigning a unique identifier to the NAS app, mapping the identifier to a logical port (e.g. TCP) and/or storing the mapping data 139 of ports to identifiers in non-volatile memory, such as the data storage 140.

In some embodiments, the mapping data 139 is transmitted to the cloud manager 150 so that client devices can more easily access the NAS app. The mapping data 139 can be associated with account information such as a network location of the NAS (e.g., IP address), a NAS identifier, and/or authentication data (e.g., user name, email, password, etc.). For example, a client device can communicate with the cloud manager 150 to access a user account and find the IP address corresponding to the user's NAS and the port corresponding to a particular app.

In one exemplary use case, a user on a mobile phone 137 can obtain the network location for the NAS and a newly downloaded NAS app 144, and can then connect to the NAS to send a request, such as a request to configure a newly installed app. In response to receiving the request, the proxy service 138 on the NAS can direct request to the NAS app 144. In response, user interface data can then be provided by the web server 146A of the NAS app 144A to the mobile phone 137, allowing the user to configure the NAS app.

In some embodiments, the client device 137 may be required to authenticate on the NAS before the client device 137 is directed to the NAS app. For example, the NAS may require a user name and password to be entered or an authentication token to be provide before processing any request from the client device.

In some embodiments, a secure connection is established after the client device 137 authenticates with the NAS 110. Subsequently, the client device may send additional requests to configure additional NAS apps 144 without the need for further authentication.

In some implementations, the present disclosure relates to devices, systems, and methods for allowing remote configuration of NAS apps. The principles disclosed herein provide a mechanism for modifying NAS apps by transmitting an apps' user interface (UI) remotely to a client device over the network 120. The proxy service 138 tracks the NAS apps 144 on the NAS 110 and directs configuration requests to the appropriate app. In certain embodiments, the NAS apps 144 have shared access to data on the data storage 140, such as user data (e.g., documents, photographs, videos, media content, etc.). In certain embodiments, the proxy service 138 may be implemented using a representational state transfer (REST) application programming interface (API). Embodiments disclosed herein advantageously provide the ability to remotely configure NAS apps 144.

Figure 2:
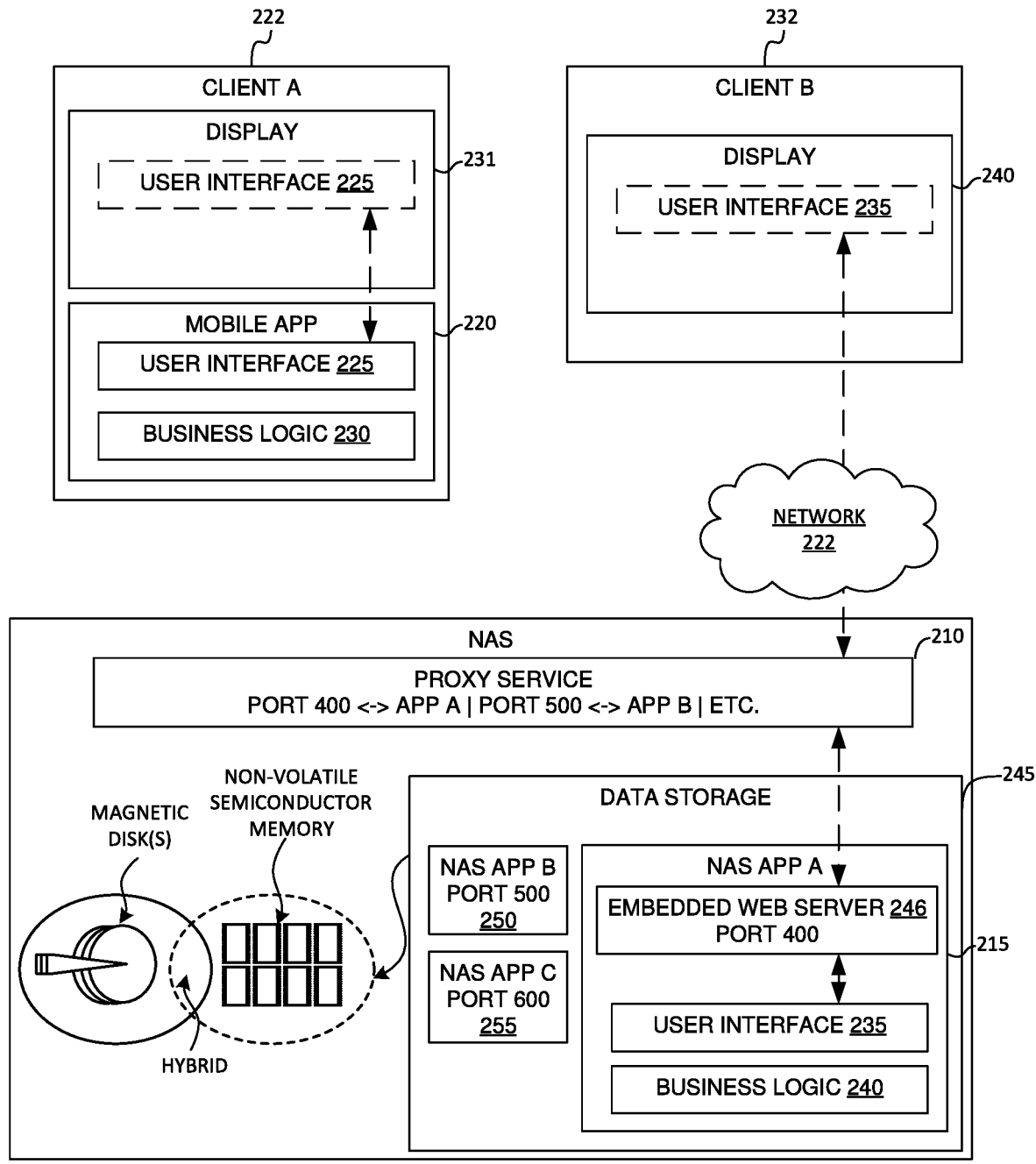
FIG. 2 is a diagram of a NAS application ("app") on a NAS device in accordance with one or more embodiments.

FIG. 2 is a diagram of a NAS 205 in accordance with one or more embodiments. In particular, FIG. 2 illustrates the difference between a NAS app 215 and a mobile app 220. Software developers typically develop apps for the most common operating systems (OS). For example, mobile apps are commonly developed for Android and iOS operating systems, which together account for the majority of smart phone and tablet devices. Due to resource constraints, software developers may not develop apps for less prevalent operating systems or may develop apps for other operating systems only if converting their existing apps is relatively easy.

A mobile app 220 includes a user interface 225 and business logic 230. The mobile app operates on a client device 232 that includes a display 231 for showing the user interface 225. As such, a mobile app 220 will have difficulty operating on a NAS 205 as a NAS typically does not have a display or an output for a display. Thus, even if the NAS were running a mobile OS (e.g. Android or an Android-based OS), a mobile app running on the NAS would be difficult to configure as the mobile app can't display its user interface on the NAS. This makes converting a mobile app to a NAS app more difficult for a software developer.

As one solution, software developers can be provided with a software development kit (SDK) or a software library that simplifies conversions of mobile apps 220 to NAS apps 215 that can operate in a display-less environment. When developers compile their program, the SDK can automatically embed a web server in the app. The NAS apps can then have their user interface 235 built using standard web technologies, and embedded in the application itself along with the rest of the business logic 240. Users can access this user interface 235 using standard browsers or an embedded web view of an application from any connected network. For example, a user on a remote client 232 can access the user interface 235 of the NAS apps over a network 222 (e.g., Internet). The NAS apps that are installed on the NAS can be first party, second party or third party.

The NAS 205 includes non-volatile memory data storage 245. The data storage 245 can store one or more NAS apps (e.g., app A 215, app B 250, app C 255), each of which includes an embedded web server with a different port assigned to each server. The data storage 245 may comprise one or more disks, wherein the NAS 205 further comprises one or more heads (not shown) actuated radially over the disk(s), and a spindle motor for rotating the disk(s). Alternatively, or in addition, to magnetic (or optical) rotating media, the non-volatile data storage 245 may comprise solid-state memory and/or other non-volatile memory, such as MRAM and/or phase change memory, or the like. In certain embodiments, the NAS 205 may comprise one or more hybrid hard drives including both magnetic media and solid-state media. In addition to the illustrated modules and components, the NAS 205 may further include one or more additional network interfaces, processors, data and/or power communication buses, memories, boards, chips/dies, or the like.

The NAS 205 may be, for example, a personal in-home box, which may be accessible by the client 232 either locally (e.g., over a LAN connection) or through a cloud-based connection. The client may be configured to implement a server interface application configured to communicate with the NAS 205 according to a particular application programming interface (API). For embodiments in which the client 232 is a mobile computing device (e.g., smartphone), the server interface application may be a mobile client application. Where the client 232 is communicatively coupled to the NAS 205 over a LAN connection, the client 232 may be configured to search for NAS devices on the network 222, wherein such search may produce a list of all available devices based on, for example, IP address.

The NAS 205 may receive data and storage access commands from a client 232 according to the relevant API (e.g., REST API). In certain embodiments, the client 232 utilizes a Domain Name Server (DNS) in communicating with the NAS 205; the NAS 205 may be callable through a web address URL.

In some embodiments, the NAS 205 comprises a network interface, which may include a wired and/or wireless interface. For example, the connection between the client 232 and the NAS 205 may be wired, such as through Ethernet, USB, or other connection, or may be wireless, such as through WiFi, Bluetooth, or other wireless connection. In certain embodiments, the connection between the client 232 and the NAS 205 is achieved over the Internet, wherein each of the client 233 and NAS 205 is connected to the Internet over a wired or wireless connection.

The NAS 205 may be configured to implement data redundancy, wherein copies or portions of user data or NAS apps stored in the data storage 245 are maintained in one or more internal and/or external drives. For example, the NAS 205 may implement redundant array of independent disks (RAID) technology, wherein the data storage 245 includes a plurality of internal drives, disks, or other data storage partitions combined into a logical unit for the purposes of data redundancy and performance improvement. In addition, or alternatively, the NAS 205 may be configured to implement RAID using one or more internal memory modules in combination with one or more external memory devices. Furthermore, data may be distributed across the RAID memory modules/drives according to any desirable or practical RAID level, depending on the level of redundancy and/or performance desired. For example, the NAS 205 may be configured to implement RAID 0, RAID 1, RAID 5, RAID 10, or other RAID technology, depending on data reliability, availability, performance and/or capacity considerations or requirements.

The data and/or requests communicated between the client 232 and the NAS 205 over the network 222 may be implemented through a particular communication protocol that both the server interface application of the client 232 and the user interface 235 and web server 246 of the NAS app are designed to execute. For example, in an embodiment, the client 232 and NAS 205 communicate according to a representational state transfer (REST) application programming interface (API), or other stateless interface, which may provide desirable interoperability between the system components over the network 222. The implemented API may allow for clients to configure NAS apps by making requests via, for example, a network address (e.g., Uniform Resource Locator (URL), Uniform Resource Identifier (URI), or the like). The requests communicated by the client 233 to the NAS 205 may comprise, for example, HTTP requests (e.g., HTTP 1.1, HTTP/2).

The client 232 may comprise a server, a desktop, a laptop, a tablet, a handheld device, or the like, and may include control circuitry comprising one or more central processing units (CPUs), memory/data storage devices or modules, network interfaces, and/or input/output interface components, and the like. The control circuitry of the client 232 may be implemented to perform the functionality described herein. The control circuitry of the client 232 may be configured to execute certain software applications for implementing the functionality described herein, such as the client application. The client application may be executable within an operating system (OS) implemented by the control circuitry of the client 233. In certain embodiments, the client 232 comprises a network interface for connecting to the network 222, which may include one or more network adapters (e.g., network interface cards (NICs)).

As described herein, the proxy service 210 may provide access to NAS apps 215 through a representational state transfer (REST) application programming interface (API) that allows the user interface 235 of the NAS app 215 to be displayed on the client device 232 (e.g., through a web browser or other client application). Accordingly, the proxy service 210 may be configured to invoke operations in the NAS 205 supported by REST API. The user interface 235 may be configured to implement various API operations (e.g., REST API operations) that can be invoked by the client 232 through communication with the NAS 205. API operations can include, for example, creation of, and/or access to, files or configuration of the NAS app 215. In some embodiments, the proxy service 210 generates a mapping of ports to app identifiers. This mapping data may be stored on the data storage 245.

The client 232 may operate as a "client" and NAS 205 may operate as a "server" in a REST architecture. As is known in the art, REST provides a software architecture for creating scalable web services. In a REST architecture, the functionality of the "client" can be separated from the functionality of the "server." Communication between the client 232 and NAS 205 may be through the REST API. In general, the client/server techniques described herein can be used in any system having a similar REST architecture having one or more clients (client computing systems) communicating with one or more servers (server computing systems), each server implementing a REST API through which clients can invoke API operations. Each API operation can be any type of service, application, or the like that can be executed by the NAS 205 on behalf of the client 232.

Figure 3:
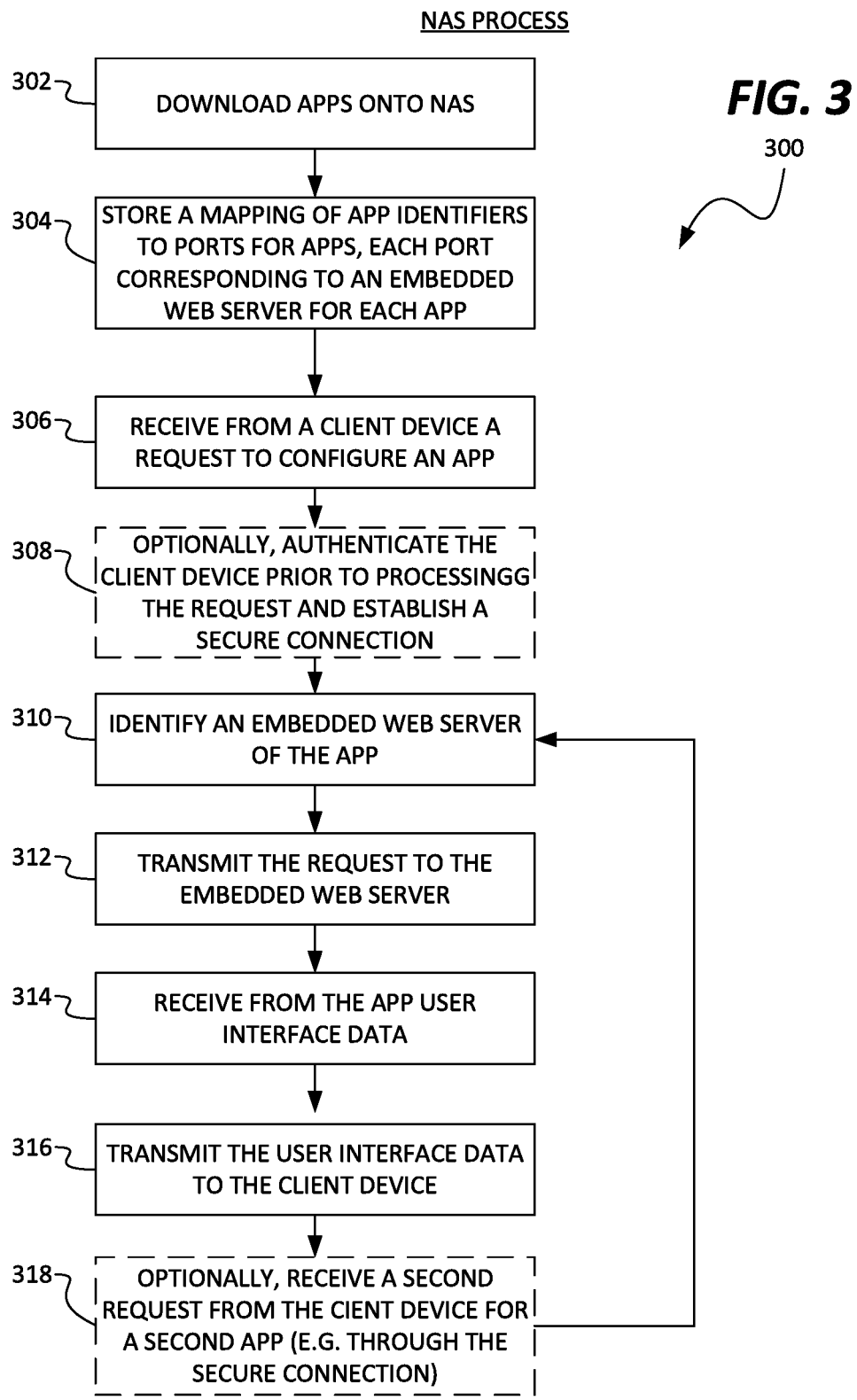
FIG. 3 is a flow diagram illustrating a process for configuring NAS apps in accordance with one or more embodiments.

FIG. 3 illustrates a process 300 for configuring NAS apps according to one or more embodiments of the present disclosure. At least some of the steps of the process 300 may be implemented at least in part by a NAS or data storage server coupled to one or more clients over a network connection.

At block 302, the process 300 involves downloading apps onto the NAS. The apps may be downloaded from an app store or other external repository for apps. In some embodiments, the app store is located on the Internet and is accessible worldwide. In one embodiment, the NAS, operating on a local network, is connected to a wide area network (e.g., Internet) with access to the app store. The NAS may be physically connected to the network via a wired or wireless connection. In one exemplary scenario, a user, via a client device, connects to the NAS using a mobile app or browser and requests that the NAS download the app to the NAS.

In some embodiments, when a NAS app comprising an embedded web server is downloaded onto the NAS, the NAS assigns a port address to the NAS. Client devices can then access the app through the port address assigned to the NAS app.

At block 304, the process 300 involves storing a mapping of app identifiers to ports for apps, with each port corresponding to an embedded web server for each app. The mapping can include all the apps stored on the NAS and their corresponding ports. This mapping can be created incrementally, as apps are downloaded.

In some embodiment, the mapping is provided to a cloud manager (which may be implemented as a cloud management server or cloud management service) to enable client devices to access the NAS apps from external networks. For example, users may try to access the NAS device when they are away from a local network and the cloud manager can facilitate that access. As NAS devices operating on home networks are typically provided with Internet Protocol (IP) addresses dynamically by an Internet Service Provider (ISP), the IP addresses can change, thus requiring registration of the IP address with a service like the cloud manager that has a permanent IP address. Clients then connect to the cloud manager to determine the dynamically allocated address of the NAS. Client devices can also obtain the port address of the NAS app from the cloud manager so that the client devices can configure the NAS app by sending requests to the NAS app.

At block 306, the process 300 involves receiving from a client device a request to configure a NAS app. The request can include the app identifier and/or the port of the NAS app. The request can also include instructions or queries made to the NAS app. In certain embodiments, a proxy service on the NAS receives the requests and manages redirection of the request to the appropriate NAS app.

Optionally, at block 308, the process 300 involves authenticating the client device prior to further processing the request. For example, the NAS may require a user name and/or password or require an authentication token from a verification service. Additionally, after authentication, a secure connection can be established between the client device and the NAS.

At block 310, the process 300 involves identifying an embedded web server of the app. In certain embodiments, the proxy service obtains the port address corresponding to the NAS app from the request from the client device. The proxy service can then use the stored mapping to identify the embedded web server that should receive the request.

At block 312, the process 300 involves transmitting the request to the embedded web server. The web server can then process the request. For example, the request may involve a command through an API implemented by the NAS app. The NAS app may perform actions on the NAS, such as modifying or deleting files. In some instances, the request involves viewing the user interface of the NAS app and the NAS app can respond by providing user interface data.

At block 314, the process 300 involves receiving from the app the user interface data. The user interface data can include a graphical user interface, such as web page, that can be displayed on the client device.

At block 316, the process 300 involves transmitting the user interface data to the client device. The client device can then display the UI data to the user, allowing the user to interact with the NAS apps UI. For example, the user can initiate other commands using the NAS UI.

At block 318, the process 300 optionally involves receiving a second request from the client device for a second app. If a secure connection has been established, this request may be received through that connection so that additional authentication is not needed. The process 300 may then repeat blocks 310-316 to allow the client device to interact with and/or configure the second app. Block 318 can then be repeated if additional apps (e.g., third app, fourth app, etc.) require configuration on the NAS.

Figure 4:
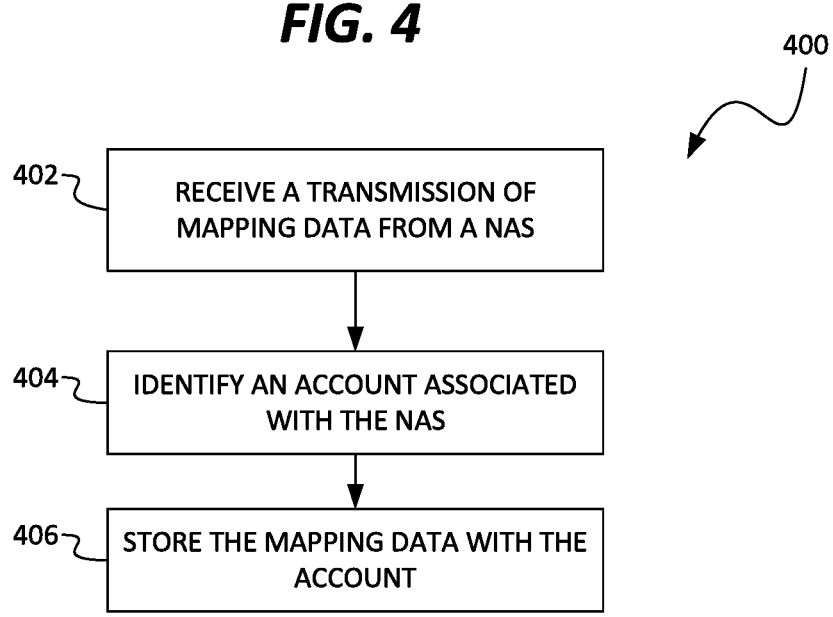
FIG. 4 is a flow diagram illustrating a process for storing mapping data in accordance with one or more embodiments.

FIG. 4 illustrates a process 400 for storing mapping data on a WAN according to one or more embodiments of the present disclosure. At least some of the steps of the process 400 may be implemented at least in part by a cloud management server or service coupled to one or more NAS devices over a wide area network connection.

At block 402, the process 400 involves receiving a transmission of mapping data from a NAS. The mapping data can include a mapping of logical ports to NAS app identifiers for NAS apps stored on the NAS. The transmitted mapping data can include all or a portion of the mapping data stored on the NAS. For example, the NAS may provide an incremental copy if previous mapping data was transmitted before or an entire copy if not. The mapping data may also be provided with or can include the network location of the NAS and a NAS identifier. The NAS may transmit the mapping data to the cloud management server to facilitate access to the mapping data from client devices. As the NAS device may have a dynamically allocated IP address, the cloud management server may be more easily reached by client devices (e.g., the server may have a static IP address).

At block 404, the process 400 involves identifying an account associated with the NAS. For example, the NAS identifier or network location (e.g., IP address) can be used to lookup account information stored in an account database. Other types of authentication data (e.g., user name, email, password, etc.) may also be used to determine the account. The account may be associated with an owner of the NAS and may have been established as part of an onboarding process when first setting up the NAS.

At block 406, the process 500 involves storing the mapping data in the account. In some instances, an account may need to be created. The mapping data can be provided to client devices associated with the account.

Figure 5:
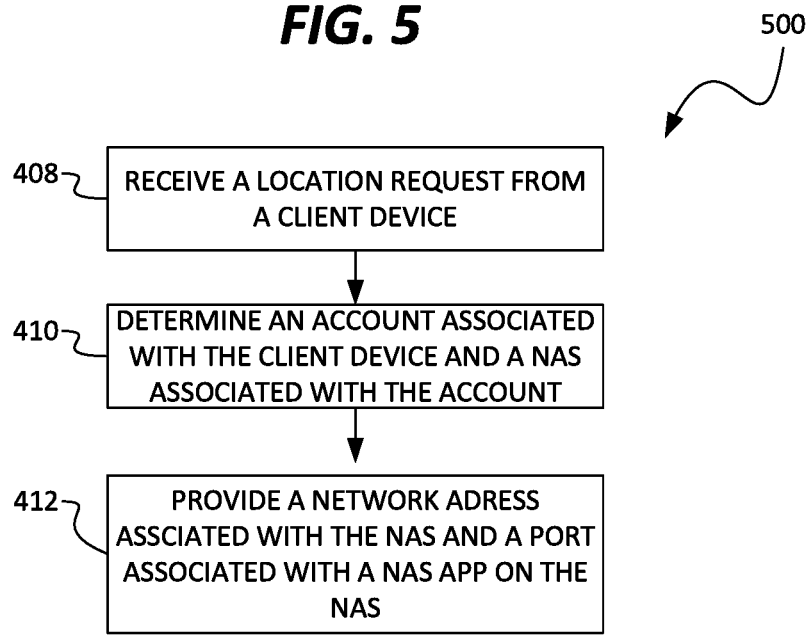
FIG. 5 is a flow diagram illustrating a process for accessing mapping data in accordance with one or more embodiments.

FIG. 5 illustrates a process 500 for providing the mapping data on a WAN according to one or more embodiments of the present disclosure. At least some of the steps of the process 500 may be implemented at least in part by a cloud management server or service coupled to one or more NAS devices over a wide area network connection.

At block 408, the process 500 involves receiving a location request from a client device. The client device may be attempting to configure a newly installed NAS app, but does not have the network location of the NAS. The client device can send account information and an identifier for the newly installed NAS app to the cloud management server. The server may require authentication data prior to processing the location request.

At block 410, the process 500 involves determining an account associated with the client device and a NAS associated with the account. The account can also include mapping data for the NAS apps that are located on the NAS, including port information for the embedded web servers on the NAS apps.

At block 412, the process 500 involves providing a network address associated with the NAS and a port associated with a NAS app on the NAS. The port may be obtained by looking up the app identifier provide by the client device against the mapping data stored on the account. The client device can then communicate with the NAS and the NAS app directly using the network address and the port.

Additional Embodiments

Those skilled in the art will appreciate that in some embodiments, other types of concurrent file modification systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A network-attached storage (NAS) device comprising:
 a non-volatile memory storing a plurality of applications, each application comprising an embedded web server and business logic;
 a network interface; and
 control circuitry configured to:
  store a mapping of an application identifier and a port corresponding to a respective embedded server for each of the plurality of applications stored in the non-volatile memory;
  receive, from a client over the network interface, a request to configure a first application of the plurality of applications, the request comprising a first port corresponding to the first application;
  determine a first embedded web server of the first application based on the mapping and the first port;
  transmit the request to the first embedded web server;
  receive, from the first application, data for providing a user interface for configuring the first application; and
  transmit the user interface data to the client,
 wherein the first application and a second application are configured to operate on non-virtualized hardware and to have access to shared data.

2. The NAS device of claim 1, wherein:
 the request from the client comprises a uniform resource locator (URL); and
 the control circuitry is further configured to obtain the first port and instructions for the first application from the URL.

3. The NAS device of claim 1, wherein the NAS device lacks a display.

4. The NAS device of claim 1, wherein the control circuitry is further configured to implement a representational state transfer (REST) application programming interface (API).

5. The NAS device of claim 1, wherein the control circuitry is further configured to authenticate the request from the client.

6. The NAS device of claim 5, wherein the control circuitry is further configured to establish a secure connection from the client to the NAS device.

7. The NAS device of claim 6, wherein the control circuitry is further configured to:
receive a second request to configure a second application from the client over the secure connection; and
without further authentication, process the second request.

8. The NAS device of claim 7, wherein processing the second request comprises:
determining a second embedded web server of the second application based on the mapping and a second port received in the second request;
transmitting the second request to the second embedded web server;
receiving, from the second application, data for providing a user interface for configuring the second application; and
transmitting the user interface data for configuring the second application to the client.

9. The NAS device of claim 1, wherein the first application and the second application are configured to have access to a same file system.

10. The NAS device of claim 1, wherein the control circuitry is further configured to:
connect to a cloud management service storing account information for a plurality of NAS devices;
identify to the cloud management service an account associated with an owner of the NAS device; and
transmit mapping data comprising at least a portion of the mapping of application identifiers and ports stored on the NAS to the cloud management service,
wherein the cloud management service is configured to provide the mapping data to a client device that is authenticated to the account.

11. A method for configuring a plurality of applications on a network attached storage (NAS) device, the method comprising:
storing a plurality of applications in non-volatile memory of the NAS, each application comprising an embedded web server and business logic;
storing a mapping of an application identifier and a port corresponding to a respective embedded server for each of the plurality of applications stored in the non-volatile memory;
receiving, from a client over a network interface, a request to configure a first application of the plurality of applications, the request comprising a first port corresponding to the first application;
determining a first embedded web server of the first application based on the mapping and the first port;
transmitting the request to the first embedded web server;
receiving, from the first application, data for providing a user interface for configuring the first application; and
transmitting the user interface data to the client,
wherein the first application and a second application are operating on non-virtualized hardware and have access to shared data.

12. The method of claim 11, wherein:
the request from the client comprises a uniform resource locator (URL); and
the method further comprises obtaining the first port and instructions for the first application from the URL.

13. The method of claim 12, wherein the NAS device lacks a display.

14. The method of claim 11, further comprising authenticating the request from the client.

15. The method of claim 14, further comprising establishing a secure connection from the client to the NAS device.

16. The method of claim 15, further comprising:
receiving a second request to configure a second application from the client over the secure connection; and
without further authentication, processing the second request.

17. The method of claim 16, wherein processing the second request comprises:
determining a second embedded web server of the second application based on the mapping and a second port received in the second request;
transmitting the second request to the second embedded web server on the second application;
receiving, from the second application, data for providing a user interface for configuring the second application; and
transmitting the user interface data for configuring the second application to the client.

18. The method of claim 11, wherein the first application and the second application have access to a same file system.

19. The method of claim 11, further comprising:
connecting to a cloud management service storing account information for a plurality of NAS devices;
identifying to the cloud management service an account associated with an owner of the NAS device; and
transmitting mapping data comprising at least a portion of the mapping of application identifiers and ports stored on the NAS to the cloud management service,
wherein the cloud management service is configured to provide a client device that authenticates to the account the mapping data.

20. A network-attached storage (NAS) device comprising:
means for non-volatile storage of a plurality of applications, each application comprising an embedded web server and business logic;
means for network communication; and
a control means configured to:
store a mapping of an application identifier and a port corresponding to a respective embedded server for each of the plurality of applications stored in the means for non-volatile storage;
receive, from a client over the means for network communication, a request to configure a first application of the plurality of applications, the request comprising a first port corresponding to the first application;
determine a first embedded web server of the first application based on the mapping and the first port;
transmit the request to the first embedded web server;
receive, from the first application, data for providing a user interface for configuring the first application; and
transmit the user interface data to the client,
wherein the first application and a second application are configured to operate on non-virtualized hardware and to have access to shared data.

* * * * *